(12) United States Patent
Toebes et al.

(10) Patent No.: US 9,350,817 B2
(45) Date of Patent: May 24, 2016

(54) RECORDING A HYPER TEXT TRANSFER PROTOCOL (HTTP) SESSION FOR PLAYBACK

(75) Inventors: John A. Toebes, Cary, NC (US); John C. Davi, Palo Alto, CA (US); Glenn T. Millican, III, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 906 days.

(21) Appl. No.: 12/507,525

(22) Filed: Jul. 22, 2009

(65) Prior Publication Data

US 2011/0022964 A1    Jan. 27, 2011

(51) Int. Cl.
G06F 3/00 (2006.01)
H04L 29/08 (2006.01)

(52) U.S. Cl.
CPC ............... H04L 67/22 (2013.01); H04L 67/02 (2013.01)

(58) Field of Classification Search
CPC . G06F 9/443; G06F 3/0481; H04L 29/08072; G06Q 10/10; H04N 21/4532
USPC .................................................. 715/747, 760
See application file for complete search history.

(56) References Cited

U.S. PATENT DOCUMENTS

| | | | | |
|---|---|---|---|---|
| 5,809,250 A | * | 9/1998 | Kisor | 709/227 |
| 5,848,396 A | * | 12/1998 | Gerace | 705/7.33 |
| 5,926,836 A | * | 7/1999 | Blumenau | 711/162 |
| 6,115,751 A | * | 9/2000 | Tam et al. | 709/240 |
| 6,144,991 A | * | 11/2000 | England | 709/205 |
| 6,189,024 B1 | * | 2/2001 | Bauersfeld et al. | 709/203 |
| 6,408,064 B1 | * | 6/2002 | Fedorov et al. | 379/265.06 |
| 6,418,471 B1 | * | 7/2002 | Shelton et al. | 709/227 |
| 6,543,004 B1 | * | 4/2003 | Cagle et al. | 714/15 |
| 6,772,214 B1 | * | 8/2004 | McClain et al. | 709/229 |
| 6,889,231 B1 | * | 5/2005 | Souder et al. | |
| 6,895,437 B1 | * | 5/2005 | Cowdrey et al. | 709/224 |
| 6,898,597 B1 | * | 5/2005 | Cook et al. | |
| 6,947,979 B1 | | 9/2005 | Pon | |
| 6,959,078 B1 | * | 10/2005 | Eilbacher et al. | 379/265.03 |
| 6,973,665 B2 | * | 12/2005 | Dudkiewicz et al. | 725/46 |
| 7,003,517 B1 | * | 2/2006 | Seibel et al. | |
| 7,043,546 B2 | * | 5/2006 | Smith et al. | 709/224 |

(Continued)

FOREIGN PATENT DOCUMENTS

CN    1402155 A    3/2003    ............ G06F 17/30

OTHER PUBLICATIONS

Hayashi et al. ("Activity Awareness: A Framework for Sharing Knowledge of People, Projects, and Places", published Sep. 12-16, 1999).*

(Continued)

*Primary Examiner* — Jessica Chuang
(74) *Attorney, Agent, or Firm* — Baker Botts L.L.P.

(57) ABSTRACT

In one embodiment, a method includes recording a sequence of online activities of a first user. The online activities include online consumption of online content by the first user. The method includes constructing a path based on the sequence of online activities of the first user. The path includes a sequence of online activity points that each correspond to one of the online activities in the sequence of online activities of the first user, and the path enables a second user to experience personally for themselves at least an approximation of the sequence of online activities of the first user. The method includes communicating the path for traversal of a portion of the path by the second user.

21 Claims, 5 Drawing Sheets

(56) References Cited

U.S. PATENT DOCUMENTS

| | | | | |
|---|---|---|---|---|
| 7,047,297 | B2* | 5/2006 | Huntington et al. | 709/224 |
| 7,072,951 | B2* | 7/2006 | von Klopp et al. | 709/219 |
| 7,099,939 | B2* | 8/2006 | von Klopp et al. | 709/224 |
| 7,107,535 | B2* | 9/2006 | Cohen ............ G06F 17/3089 | 707/E17.116 |
| 7,136,791 | B2* | 11/2006 | Darwent et al. | 703/6 |
| 7,155,425 | B2* | 12/2006 | Nykanen | |
| 7,155,508 | B2* | 12/2006 | Sankuratripati et al. | 709/224 |
| 7,165,105 | B2* | 1/2007 | Reiner et al. | 709/224 |
| 7,222,306 | B2* | 5/2007 | Kaasila ............ G06F 3/0481 | 715/760 |
| 7,234,117 | B2* | 6/2007 | Zaner et al. | 715/758 |
| 7,269,633 | B2* | 9/2007 | Allan | 709/217 |
| 7,283,927 | B2* | 10/2007 | Delargy | 702/177 |
| 7,311,608 | B1* | 12/2007 | Danieli ............ A63F 13/12 | 463/42 |
| 7,313,595 | B2* | 12/2007 | Rust | 709/204 |
| 7,359,935 | B1* | 4/2008 | Karipides et al. | 709/203 |
| 7,367,043 | B2* | 4/2008 | Dudkiewicz et al. | 725/138 |
| 7,376,735 | B2* | 5/2008 | Straut et al. | 709/224 |
| 7,376,896 | B2* | 5/2008 | Ullmann et al. | 715/704 |
| 7,379,848 | B2* | 5/2008 | Yu et al. | 702/186 |
| 7,404,207 | B2* | 7/2008 | Perry | 726/15 |
| 7,428,493 | B2* | 9/2008 | Shkedi ............ G06F 17/30867 | 705/35 |
| 7,480,694 | B2* | 1/2009 | Blennerhassett et al. | 709/203 |
| 7,502,797 | B2* | 3/2009 | Schran et al. | |
| 7,530,028 | B2* | 5/2009 | Mulcahy et al. | 715/772 |
| 7,549,054 | B2* | 6/2009 | Brodie ............ G06Q 10/10 | 713/166 |
| 7,613,769 | B1* | 11/2009 | Hess ............ G06Q 30/02 | 707/999.005 |
| 7,617,160 | B1* | 11/2009 | Grove ............ G06Q 10/10 | 705/500 |
| 7,620,610 | B2* | 11/2009 | Macbeth et al. | 706/14 |
| 7,653,705 | B2* | 1/2010 | Gudipaty et al. | 709/218 |
| 7,665,019 | B2* | 2/2010 | Jaeger | 715/704 |
| 7,702,685 | B2* | 4/2010 | Shrufi ............ G06Q 10/10 | 707/760 |
| 7,761,393 | B2* | 7/2010 | Macbeth et al. | 706/16 |
| 7,788,040 | B2* | 8/2010 | Haskell et al. | 702/19 |
| 7,792,948 | B2* | 9/2010 | Zhao et al. | 709/224 |
| 7,792,954 | B2* | 9/2010 | Hanson et al. | 709/224 |
| 7,792,976 | B2* | 9/2010 | Zhao et al. | 709/228 |
| 7,809,752 | B1* | 10/2010 | Kozyrczak et al. | 707/790 |
| 7,814,067 | B2* | 10/2010 | Souder et al. | 707/682 |
| 7,831,451 | B1* | 11/2010 | Morse ............ G06Q 10/10 | 705/2 |
| 7,836,002 | B2* | 11/2010 | Macbeth et al. | 706/46 |
| 7,853,684 | B2* | 12/2010 | Koch et al. | 709/224 |
| 7,882,058 | B1* | 2/2011 | Ghaed ............ G06Q 10/10 | 707/608 |
| 7,882,212 | B1* | 2/2011 | Nappier et al. | 709/224 |
| 7,930,314 | B2* | 4/2011 | Gupta | 707/769 |
| 7,941,525 | B1* | 5/2011 | Yavilevich | 709/224 |
| 7,953,719 | B2* | 5/2011 | Straut et al. | 707/705 |
| 7,962,616 | B2* | 6/2011 | Kupferman et al. | 709/225 |
| 7,966,398 | B2* | 6/2011 | Wiles, Jr. | 709/224 |
| 7,970,637 | B2* | 6/2011 | Macbeth et al. | 705/7.11 |
| 7,979,555 | B2* | 7/2011 | Rothstein et al. | 709/227 |
| 7,987,491 | B2* | 7/2011 | Reisman | 725/112 |
| 8,285,833 | B2* | 10/2012 | Blair | 709/224 |
| 8,364,514 | B2* | 1/2013 | Macbeth et al. | 705/7.25 |
| 8,392,229 | B2* | 3/2013 | Macbeth et al. | 705/7.11 |
| 8,392,553 | B2* | 3/2013 | Petropoulakis et al. | 709/224 |
| 8,402,525 | B1* | 3/2013 | Shah et al. | 726/8 |
| 8,407,353 | B2* | 3/2013 | Moses et al. | 709/229 |
| 8,418,067 | B2* | 4/2013 | Cheng ............ G06Q 10/06 | 715/739 |
| 8,738,739 | B2* | 5/2014 | Makar ............ G06F 17/30867 | 709/202 |
| 2002/0035498 | A1* | 3/2002 | Kehoe et al. | 705/8 |
| 2002/0062359 | A1* | 5/2002 | Klopp et al. | 709/219 |
| 2002/0062369 | A1* | 5/2002 | von Klopp et al. | 709/224 |
| 2002/0065911 | A1* | 5/2002 | von Klopp et al. | 709/224 |
| 2002/0065912 | A1* | 5/2002 | Catchpole et al. | 709/224 |
| 2002/0070953 | A1* | 6/2002 | Barg et al. | 345/700 |
| 2002/0092031 | A1* | 7/2002 | Dudkiewicz et al. | 725/138 |
| 2002/0100046 | A1* | 7/2002 | Dudkiewicz | 725/46 |
| 2002/0124249 | A1* | 9/2002 | Shintani et al. | 725/32 |
| 2002/0129363 | A1* | 9/2002 | McGuire | 725/37 |
| 2002/0143931 | A1* | 10/2002 | Smith et al. | 709/224 |
| 2002/0174117 | A1* | 11/2002 | Nykanen | 707/4 |
| 2003/0023715 | A1* | 1/2003 | Reiner et al. | 709/224 |
| 2003/0074400 | A1* | 4/2003 | Brooks et al. | 709/203 |
| 2003/0140121 | A1* | 7/2003 | Adams | 709/219 |
| 2003/0163372 | A1* | 8/2003 | Kolsy | 705/14 |
| 2003/0163427 | A1* | 8/2003 | Fung et al. | 705/51 |
| 2004/0030741 | A1* | 2/2004 | Wolton et al. | 709/202 |
| 2004/0041836 | A1* | 3/2004 | Zaner et al. | 345/751 |
| 2004/0059746 | A1* | 3/2004 | Error et al. | 707/102 |
| 2004/0073644 | A1* | 4/2004 | Koch et al. | 709/223 |
| 2004/0093334 | A1* | 5/2004 | Scherer ............ G06Q 30/02 | |
| 2004/0111488 | A1* | 6/2004 | Allan | 709/217 |
| 2004/0158631 | A1* | 8/2004 | Chang et al. | 709/224 |
| 2004/0174397 | A1* | 9/2004 | Cereghini et al. | 345/855 |
| 2004/0205091 | A1* | 10/2004 | Mulcahy et al. | 707/204 |
| 2004/0249650 | A1* | 12/2004 | Freedman et al. | 705/1 |
| 2005/0034148 | A1* | 2/2005 | Jaeger | 725/14 |
| 2005/0125430 | A1* | 6/2005 | Souder et al. | 707/100 |
| 2005/0144637 | A1* | 6/2005 | Shikata et al. | 725/35 |
| 2005/0158767 | A1* | 7/2005 | Haskell et al. | 435/6 |
| 2005/0160167 | A1* | 7/2005 | Cheng ............ G06Q 1/06 | 709/224 |
| 2005/0223093 | A1* | 10/2005 | Hanson et al. | 709/224 |
| 2006/0101022 | A1* | 5/2006 | Yu et al. | 707/10 |
| 2006/0165003 | A1* | 7/2006 | Partridge | 370/248 |
| 2006/0167662 | A1* | 7/2006 | Yu et al. | 702/186 |
| 2006/0168188 | A1* | 7/2006 | Dutton | 709/223 |
| 2006/0200832 | A1* | 9/2006 | Dutton | 719/318 |
| 2007/0043608 | A1* | 2/2007 | May et al. | 705/10 |
| 2007/0050844 | A1 | 3/2007 | Lebel | |
| 2007/0055766 | A1* | 3/2007 | Petropoulakis et al. | 709/224 |
| 2007/0106692 | A1* | 5/2007 | Klein | 707/104.1 |
| 2007/0133940 | A1* | 6/2007 | Freeman | 386/52 |
| 2007/0143343 | A1* | 6/2007 | Iverson | 707/104.1 |
| 2007/0204310 | A1* | 8/2007 | Hua et al. | 725/88 |
| 2007/0255754 | A1* | 11/2007 | Gheel | 707/104.1 |
| 2007/0266305 | A1* | 11/2007 | Cong et al. | 715/500.1 |
| 2007/0297590 | A1* | 12/2007 | Macbeth et al. | 379/201.02 |
| 2007/0299631 | A1* | 12/2007 | Macbeth et al. | 702/187 |
| 2007/0299712 | A1* | 12/2007 | Macbeth et al. | 705/9 |
| 2007/0299713 | A1* | 12/2007 | Macbeth et al. | 705/9 |
| 2007/0299795 | A1* | 12/2007 | Macbeth et al. | 706/16 |
| 2007/0299796 | A1* | 12/2007 | Macbeth et al. | 706/16 |
| 2007/0299949 | A1* | 12/2007 | Macbeth et al. | 709/223 |
| 2007/0300174 | A1* | 12/2007 | Macbeth et al. | 715/772 |
| 2007/0300179 | A1* | 12/2007 | Friedlander | 715/781 |
| 2007/0300185 | A1* | 12/2007 | Macbeth et al. | 715/825 |
| 2007/0300225 | A1* | 12/2007 | Macbeth et al. | 718/100 |
| 2008/0008458 | A1* | 1/2008 | Gudipaty et al. | 386/131 |
| 2008/0046218 | A1* | 2/2008 | Dontcheva ............ G06F 11/32 | 702/186 |
| 2008/0208579 | A1* | 8/2008 | Weiss et al. | 704/244 |
| 2008/0209045 | A1* | 8/2008 | Rothstein et al. | 709/227 |
| 2008/0215426 | A1* | 9/2008 | Guldimann ............ G06Q 30/02 | 705/14.61 |
| 2008/0236904 | A1* | 10/2008 | Zukowski et al. | 178/18.03 |
| 2008/0279346 | A1* | 11/2008 | Ezumi | 379/68 |
| 2008/0307454 | A1* | 12/2008 | Ahanger et al. | 725/36 |
| 2009/0003537 | A1* | 1/2009 | Katis et al. | 379/68 |
| 2009/0013347 | A1* | 1/2009 | Ahanger et al. | 725/36 |
| 2009/0024962 | A1* | 1/2009 | Gotz | 715/838 |
| 2009/0029775 | A1* | 1/2009 | Ruppert et al. | 463/42 |
| 2009/0129564 | A1* | 5/2009 | Sung et al. | 379/68 |
| 2009/0164902 | A1* | 6/2009 | Cohen et al. | 715/716 |
| 2009/0175423 | A1* | 7/2009 | Portman et al. | 379/68 |
| 2009/0257565 | A1* | 10/2009 | Nelson et al. | 379/68 |
| 2010/0100449 | A1* | 4/2010 | Broberg et al. | 705/14.68 |
| 2010/0138360 | A1* | 6/2010 | Cutler et al. | 705/36 R |
| 2010/0138416 | A1* | 6/2010 | Bellotti | 707/736 |
| 2010/0169792 | A1* | 7/2010 | Ascar et al. | 715/744 |
| 2010/0325547 | A1* | 12/2010 | Keng et al. | 715/723 |
| 2011/0173235 | A1* | 7/2011 | Aman et al. | 707/792 |

(56) References Cited

U.S. PATENT DOCUMENTS

2011/0206198 A1* 8/2011 Freedman et al. ....... 379/265.03
2011/0264484 A1* 10/2011 Macbeth et al. ............. 705/7.29
2011/0276396 A1* 11/2011 Rathod ..................... 705/14.49

OTHER PUBLICATIONS

International Search Report and Written Opinion for PCT Application No. PCT/US/2010/39892, Mar. 20, 2012.

State Intellectual Property Office of the People's Republic of China, Chinese First Office Action and Text of the First Office and Search Report—English Translation; Application No. 201080033280.6, Ser. No. 2014 062701152750; (18 pgs), Jul. 2, 2014.

State Intellectual Property Office of the People's Republic of China, Chinese Third Office Action and Text of the Third Office Action—English Translation; Application No. 201080033280.6; (7 pgs), Jul. 10, 2015.

State Intellectual Property Office of the People's Republic of China, Chinese Second Office Action and Text of the Second Office Action—English Translation; Application No. 201080033280.6; (8 pgs), Feb. 11, 2015.

\* cited by examiner

RECORDING A HYPER TEXT TRANSFER PROTOCOL (HTTP) SESSION FOR PLAYBACK

TECHNICAL FIELD

This disclosure relates generally to social networking.

BACKGROUND

Social networking and social media are playing an increasing role in the way Internet users use or experience the Internet. In the past, most Internet users were only consumers of content available on the Internet. However, as the Internet has developed and evolved, it has become easier for Internet users—including Internet users who lack technical expertise—to create content and publish it on the Internet. As a result, in addition to being consumers of content available on the Internet, more and more Internet users are becoming creators and publishers of content available on the Internet.

DESCRIPTION OF EXAMPLE EMBODIMENTS

Overview

In one embodiment, a method includes recording a sequence of online activities of a first user. The online activities include online consumption of online content by the first user. The method includes constructing a path based on the sequence of online activities of the first user. The path includes a sequence of online activity points that each correspond to one of the online activities in the sequence of online activities of the first user, and the path enables one or more second users to experience personally for themselves at least an approximation of the sequence of online activities of the first user. The method includes communicating the path for traversal of one or more portions of the path by the second users.

Description

Figure 1:
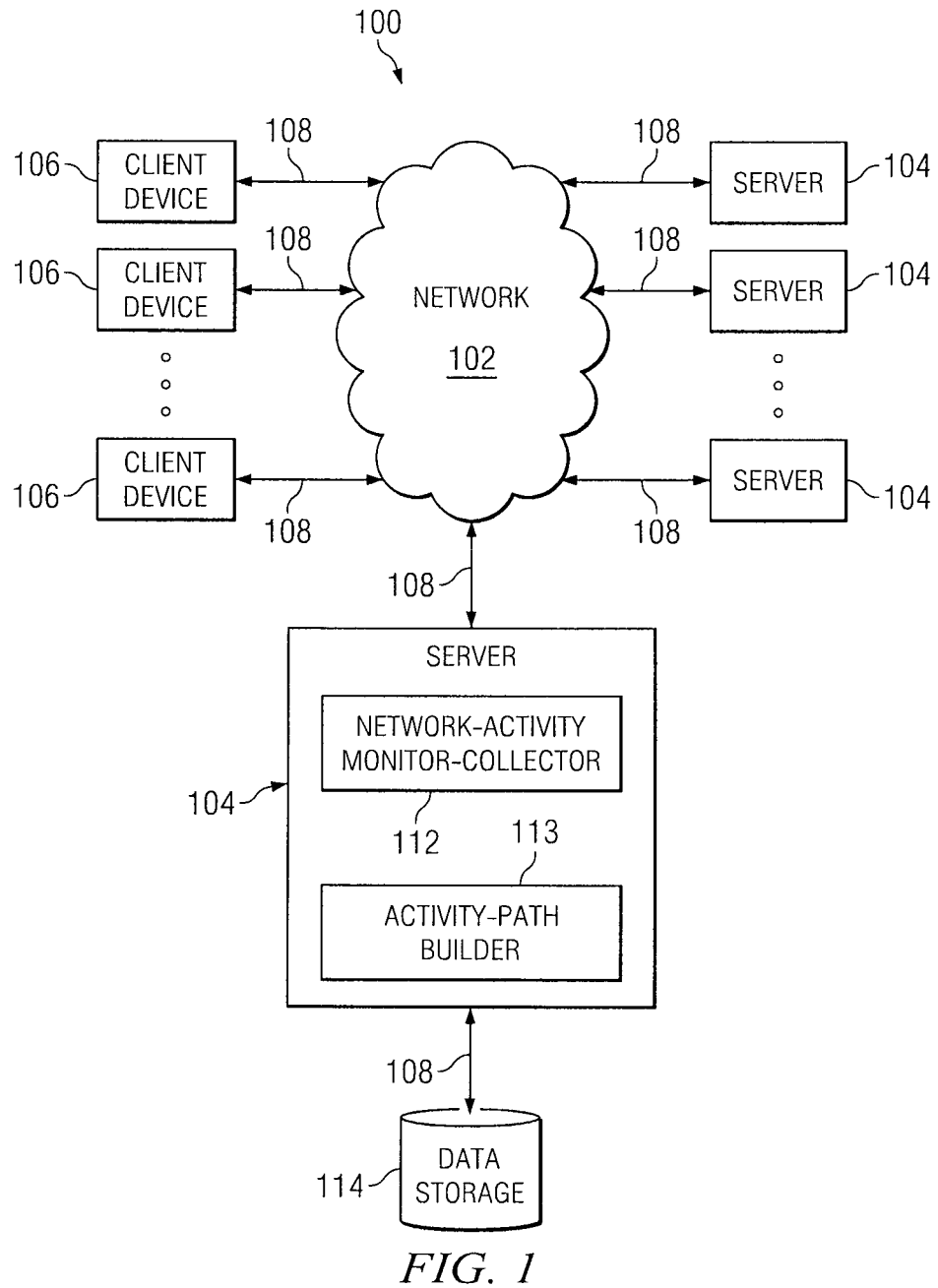
FIG. 1 illustrates an example system for constructing an activity path representing a network experience of a microproducer.

FIG. 1 illustrates an example system 100 for constructing an activity path representing a network experience of a microproducer. System 100 includes a network 102 coupling one or more servers 104 and client devices 106 to each other. In particular embodiments, network 102 is an intranet, an extranet, a virtual private network (VPN), a local area network (LAN), a wireless LAN (WLAN), a wide area network (WAN), a metropolitan area network (MAN), a portion of the Internet, or another network 102 or a combination of two or more such networks 102. The present disclosure contemplates any suitable network 102. Network 102 may include one or more networks 102. Links 108 couple servers 104 and client devices 106 to network 102. In particular embodiments, one or more links 108 each include one or more wireline, wireless, or optical links. In particular embodiments, one or more links 108 each include an intranet, an extranet, a VPN, a LAN, a WLAN, a WAN, a MAN, a portion of the Internet, or another link 108 or a combination of two or more such links 108. The present disclosure contemplates any suitable links 108. A link 18 may include one or more links 108.

A server 104 may be internal or external to network 102 and may be directly or indirectly coupled to network 102. A server 104 may be unitary or distributed across multiple computer systems or datacenters, according to particular needs. Example servers include, but are not necessarily limited to, application servers, web servers, e-mail servers, database servers, content management servers, etc. The present disclosure contemplates any suitable servers 104. A server 104 may include one or more servers 104. A server 104 that is a web or other server providing access to content may have access to one or more databases storing content, according to particular needs. Herein, reference to content encompasses audio, FLASH or other plugins, dynamic or static images, text, video, web pages, or other content, where appropriate. The present disclosure contemplates any suitable content.

In particular embodiments, one or more servers 104 each include one or more servers or other computer systems for hosting web pages or particular elements of web pages. A server 104 may host Hyper Text Markup Language (HTML) files or other file types, or may dynamically create or constitute files upon a request, and communicate them to client devices 106 in response to Hyper Text Transfer Protocol (HTTP) or other requests from client devices 106. In particular embodiments, a web browser at a client device 106 may render a web page from one or more HTML files received from one or more servers 104. In particular embodiments, a server 104 may render a web page and then serve the rendered web page to a client device 106 for display. When a web page renders, the browser or the server rendering the web page may retrieve one or more elements of the web page from one or more servers 104 providing access to particular content. As an example, multiple servers 104 operated by a single publisher may host elements of web pages of the publisher. For example, the publisher may operate one or more first servers 104 for video, one or more second servers 104 for text, one or more third servers 104 for images, and one or more fourth servers 104 for advertisements. Servers 104 operated by the publisher may serve the domain of the publisher. When a web browser at a client device 106 renders a web page, the web browser may retrieve and load one or more elements of the web page from one or more servers 104, as directed by one or more HTML or other files for rendering the web page. The web browser may retrieve and load one or more video files in the web page from one or more databases containing video.

A client device 106 may be directly or indirectly coupled to network 102. Example client devices include, but are not necessarily limited to, workstations, notebook computer systems, desktop computer systems, tablet computer systems, personal digital assistants (PDAs), mobile telephones, etc. The present disclosure contemplates any suitable client devices 106. A client device 106 may include one or more client devices 106. A client device 106 may communicate with one or more servers 104, one or more other client devices 106, or both via network 102 using one or more particular communication protocols, according to particular needs. The present disclosure contemplates any suitable communication protocols for communicating via network 102. Client device 106 may enable a person at client device 106 to interact with or otherwise access content or one or more services at one or more servers 104, interact or otherwise communicate with one or more other persons at one or more other client devices 106, or perform other actions using the Internet or one or more other networks. As an example and not by way of limitation, a client device 106 may enable a person at client device 106 to send or receive e-mail or instant messages (IMs), access web pages, publish information (such as content) at one or more web sites, or chat in one or more online chat rooms with one or more other persons at one or more other client devices 106.

In particular embodiments, a client device 106 may enable a user at client device 106 to access content via one or more servers 104 and enable the user to communicate with one or more other users at one or more other client devices 106. Reference to a client device 106 may encompass a user at client device 106, and vice versa, where appropriate. A user may be a person. A client device 106 may receive input from and communicate output to a user at client device 106. As examples and not by way of limitation, client device 106 may receive input from the user by way of a keyboard, mouse, or touch-screen and communicate output to the user by way of a display. Client devices 106 need not be the same throughout system 100. One or more first client devices 106 may differ from one or more second client devices 106. The present disclosure contemplates any suitable combination of any suitable client devices 106.

A client device 106 may have a web browser, such as INTERNET EXPLORER. A user at client device 106 may click on or otherwise select a hyperlink (or an element, such as hypertext or a graphical element, embedding the hyperlink) in an e-mail, an IM, a web page, or a document, and a Uniform Resource Locator (URL) or other address in the hyperlink may direct the web browser to a particular server 104 (which may be web servers). The hyperlink may include other information in addition to a URL or other address. The web browser may generate a Hyper Text Transfer Protocol (HTTP) request and communicate the HTTP request to server 104. Server 104 may accept the HTTP request and communicate to client device 106 one or more Hyper Text Markup Language (HTML) files responsive to the HTTP request. Client device 106 may render a web page from the HTML files from server 104 for presentation to the user. The present disclosure contemplates any suitable web page files. As an example and not by way of limitation, web pages may render from HTML files, Extensible HyperText Markup Language (XHTML) files, or Extensible Markup Language (XML) files, according to particular needs. Such pages may also execute scripts such as, by way of example and not by way of limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The present disclosure contemplates any suitable web pages. As an example and not by way of limitation, a web page hosted by a server 104 may be static or dynamic. In particular embodiments, multiple web pages stored together in a common directory at a server 104 make up a website or a portion of a website. In particular embodiments, a web page includes one or more elements. As an example and not by way of limitation, presented (or rendered) elements of a web page may include static text, static images, animated images, audio, video, interactive text, interactive illustrations, buttons, hyperlinks, or forms. Such elements may each occupy a particular space on the web page when displayed. Internal (or hidden) elements of a web page may include, for example and not by way of limitation, comments, meta elements, databases, diagramation and style information, and scripts, such as JAVASCRIPT. One or more elements of a web page may be inline frames (IFrames) which enable web developers to embed HTML documents into other HTML documents. Herein, reference to a document may encompass a web page, where appropriate. Reference to an element of a web page may encompass one or more portions of a web page file for rendering the element, and vice versa, where appropriate.

In system 100, a network-activity monitor-collector 112 resides at one or more servers 104. Network-activity monitor-collector 112 may include a hardware, software, or embedded logic component or a combination of two or more such components for monitoring and collecting information on the network activities (or online activities) of users on network 102. Network-activity monitor-collector 112 may include one or more network-activity monitors-collectors 112. Network-activity monitor-collector 112 may monitor and collect information on the network activities of microproducers for use in constructing activity paths representing network experiences of microproducers, as described below. Data storage 114 may store the collected information on the network activities of users for subsequent processing and analysis.

In particular embodiments, an activity-path builder 113 resides at one or more servers 104. Activity-path builder 113 may, but need not necessarily, co-reside with network-activity monitor-collector 112 at one or more servers 104. Activity-path builder 113 may include a hardware, software, or embedded logic component or a combination of two or more such components for constructing activity paths based on network activities of microproducers, as described below. To construct activity paths, activity-path builder 113 may access information on the network activities of microproducers stored by data storage 114. Activity-path builder 113 may include one or more activity-path builders 113. Data storage 114 may store activity paths constructed by activity-path builder 103. In particular embodiments, consumers may access activity paths stored at data storage 114 through server 104 coupled to data storage 114.

Many people are interested in the experiences and other aspects of the lives of others. Some people hold special attractions for others. As an example and not by way of limitation, a celebrity may have fans who are very interested in the experiences and other aspects of the life of the celebrity. Given the opportunity, some fans would likely jump at the chance to share the same experiences as their idols. As another example, less famous or more ordinary persons may have acquaintances, friends, or family members who are interested in sharing the same experiences as they.

Particular embodiments monitor and collect information on network activities (which in particular embodiments may be Internet activities) performed by a microproducer. In particular embodiments, a microproducer is any person whose network experiences may be consumed by one or more other persons. The present disclosure contemplates any suitable microproducer. As an example and not by way of limitation, a microproducer may be an actor; an artist; an athlete; an author; a blogger; a celebrity; an editorial writer; an entrepreneur; an executive; an inventor; a manager; a musician; a teacher or other educator; an ordinary person who may have a following of sorts among his acquaintances, friends, or family; or another suitable person. One or more network activities performed by a microproducer may collectively make up a network experience (which in particular embodiments may be an Internet experience) of the microproducer.

A network experience of a microproducer (which may be made up of one or more network activities performed by the microproducer) may include consuming, interacting with, creating, or publishing one or more instances of content on the Internet or one or more other networks, which the microproducer may do with one or more client devices 106. As an example and not by way of limitation, a network experience of a microproducer may include the microproducer actively or passively participating or otherwise experiencing one or more of the following: blogging; chatting in a chat room; downloading or otherwise accessing online content; IMing; listening to audio online; navigating or searching a web site; reading articles, books, essays, papers or other text online; running web searches; shopping online; surfing the World Wide Web; watching or reading news stories; watching videos online; or any other suitable network activity. The present disclosure contemplates any suitable network experience including any suitable number of any suitable network activities.

Particular embodiments construct an activity path based on a network experience of a microproducer. The activity path may represent a sequence of network activities performed by the microproducer. The activity path may include one or more activity points, and each activity point may correspond to a particular network activity in the sequence of network activities. An activity point in the activity path may facilitate one or more other persons experiencing for themselves a network experience of the microproducer. In particular embodiments, the other persons are consumers of the network experience of the microproducer. Particular embodiments may block, convert, or modify one or more particular activity points in an activity path for traversal by one or more particular consumers, according to particular needs, as for example particular activity points in the activity path may be unsuitable for particular consumers. Particular embodiments may, after or during the monitoring and collection of information on the network activities of a microproducer, select particular ones of the network activities that may be more amenable or germane to consumption as part of a network experience. Particular embodiments may construct an activity path based only on network activities so selected. The selection of particular ones of the network activities may be manual or automatic, according to particular needs. Particular embodiments may use one or more predetermined criteria to select particular ones of the network activities, as described below.

Particular embodiments provide a user interface for traversing an activity path in response to input from a consumer indicating that the consumer wants to consume a network experience of a microproducer. As an example and not by way of limitation, a consumer may cause a web browser at a client device 106 of the consumer to navigate to a web page (which may be part of a website) providing access to activity paths of microproducers. The consumer may, through client device 106, select one of the microproducers and then select one of the activity paths of the microproducer. The consumer may make the selection through one or more icons, drop-down menus, or other components of the web page. In response to the selections made by the consumers, particular embodiments may provide a user interface (which the web browser at client device 106 may render and display to the consumer) for the consumer to traverse the activity path of the microproducer with. By traversing the activity path, the consumer may experience for himself or herself the network experience of the microproducer that the activity path was constructed based on. The present disclosure contemplates any suitable user interface for traversing any suitable activity path. In particular embodiments, the user interface may include one or more control components that enable the consumer to control one or more aspects of his or her traversal of or other interaction with the activity path.

In particular embodiments, a user interface that enables a consumer to traverse a microproducer's activity path may include one or more web pages, and each of the web pages may be hosted at a particular website. Note that different web pages contained in the user interface may be hosted at the same website or at different websites. Particular embodiments may dynamically construct the web pages for the consumer. Each of the web pages may contain one or more first components and one or more second components. Each of the first components may correspond to a network activity performed by the microproducer at the particular website hosting the web page that contains the first components, which in turn may correspond to an activity point on the microproducer's activity path. Each of the second components may be personalized for the consumer. The web pages, when accessed by the consumer, may enable the consumer to have a network experience similar to what the microproducer had at the websites hosting the web pages.

Figure 2:
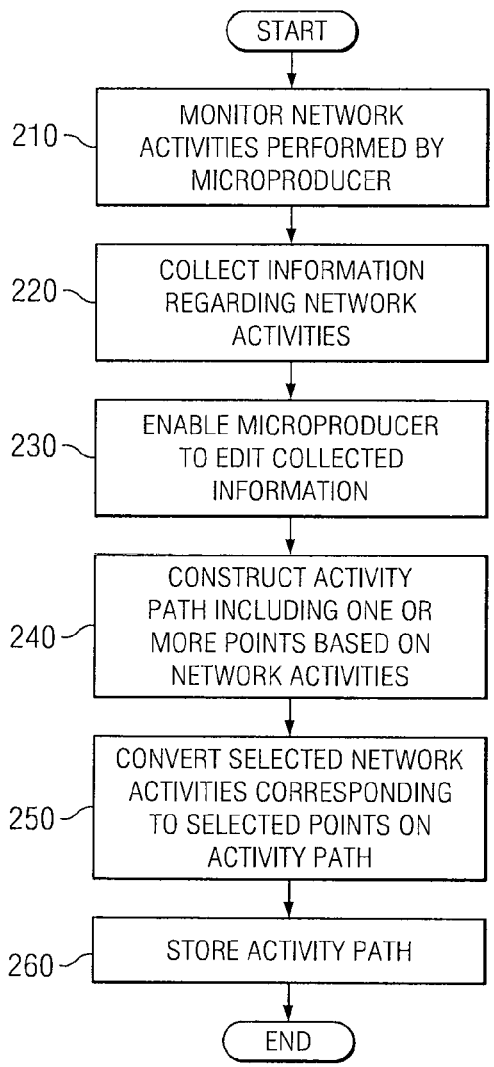
FIG. 2 illustrates an example method for constructing an activity path representing a network experience of a microproducer.

FIG. 2 illustrates an example method for constructing an activity path representing a network experience of a microproducer. The method starts at step 200, where network activities performed by a microproducer are monitored. The network activities performed by the microproducer may be monitored through various suitable means. For example and without limitation, network-activity monitor-collector 112 in FIG. 1 may monitor the microproducer's network activities performed at various network sites, or each network site may independently monitor the activities performed at its own site by the microproducer while the microproducer visits that site. A network activity may be any type of activity the microproducer may conduct on the Internet or another network, including but not limited to consuming, interacting with, or creating and publishing content. For example, the microproducer may watch videos, listen to audio, download or upload files, view or post messages, search for information, etc. In particular embodiments, each network activity may also be considered an event.

At step 220, information regarding some or all of the network activities conducted by the microproducer is collected. Again, the network activity information may be collected through various suitable means. For example and without limitation, network-activity monitor-collector 112 in FIG. 1 may collect the information regarding some or all of the microproducer's network activities performed at various network sites, or each network site may independently collect the information regarding some or all of the activities performed at its own site by the microproducer while the microproducer visits that site. In particular embodiments, the information may describe the nature or various aspects and characteristics of the network activities performed by the microproducer, such as, for example, which video has the microproducer watched and when and at what website, which audio has the microproducer listened to and when and at what website, what message has the microproducer posted and when and what website, etc. The collected information may be stored in a data store, e.g., data storage 114 in FIG. 1.

In particular embodiments, the information is collected based on a set of rules that indicate information regarding what types of network events or activities is or is not to be monitored or collected. Certain network activities may be private to the microproducer and the microproducer may not wish to share such network activities with other people. For example, when the microproducer reads her personal emails, she may not wish the other people to read her emails as well. To protect the microproducer's privacy, in particular embodiments, the microproducer may specify what types or categories of network activities or what specific network activities are or are not to be shared. Only information regarding those network activities that the microproducer is willing to share with the other people is collected.

At step 230, the microproducer may edit the network activity information collected. There may be various suitable means that enable the microproducer to edit the network activity information collected with respect to the microproducer. For example and without limitation, the collected network activity information may be represented using various metadata, which may describe each particular activity that the microproducer has performed in terms of the type of the performed activity, the network content involved, the time the activity was performed, etc. The microproducer may review the metadata representing all of the collected network activity information at a central location, e.g., at server 104. The metadata may be presented to the microproducer in one or more web pages hosted at server 104, and the microproducer may edit the metadata via the web pages as she desires.

The microproducer may modify or remove any specific pieces of information collected. For example, information collected that the microproducer does not wish to share with the other people may be deleted. The microproducer thus may have complete control over the information regarding her network activities that are to be share with the other people. The modified information, after being reviewed, edited, and approved by the microproducer, may again be stored in data storage 114.

At step 240, an activity path is constructed based on the information regarding the network events or activities that the microproducer is willing to share with the other people. In particular embodiments, only network activity information that has been reviewed and approved by the microproducer may be used to construct the activity path. The activity path may be constructed, for example and without limitation, by activity-path builder 113. The activity path includes one or more points, and each point corresponds to a network event or activity conducted by the microproducer. For example, a first point on the activity path may correspond to the microproducer watching a video; a second point on the activity path may correspond to the microproducer posting a message; a third point on the activity path may correspond to the microproducer downloading an audio file; and so on. In particular embodiments the points on the activity path are arranged in chronological order of the corresponding network events or activities being performed by the microproducer.

Certain network events or activities may not be readily suitable for subsequent consumption by the other people, e.g., the consumers. At step 250, network activities such as these on the activity path are converted or modified so that they become suitable for subsequent consumption by the others. In particular embodiments, activity-path builder 113 may automatically convert or modify such network activities, for example, based on a set of predetermined rules. Alternatively, in particular embodiments, such network activities may be converted or modified by a human supervising the process. For example, the microproducer may post a message to a blog at some point on the activity path. However, the event or act of posting the message is not readily suitable to be consumed by other people, since the other people would not post exactly the same message to the same blog. The posting of the message may be modified to viewing of the posted message so that the other people may view the message posted by the microproducer. Similarly, when the microproducer uploads a file to a website at some point on the activity path, the act of uploading the file may be modified to watching, listening to, viewing, or downloading the file uploaded by the microproducer. In these cases, the predetermined rules for activity-path builder 113 may indicate that any activity involving posting a piece of content to the network is converted to viewing that piece of content, and any activity involving uploading a piece of content to the network is converted to downloading or viewing that piece of content.

Certain network events or activities may not be accessible to the other people. For example, the microproducer may have posted a message and subsequently has removed the message due to various reasons. Alternatively, the message may have been removed by the administrator of the website where the message has been posted. Once the message is removed, it is no longer accessible to the other people. In this case, the point on the activity path corresponding to the act of posting the message may be removed from the activity path. Similarly, suppose the microproducer has uploaded a video clip to a website, but the website's administrator subsequently has removed the video clip. In this case, the point on the activity path corresponding to the act of posting the video clip may be removed from the activity path. In these cases, the predetermined rules for activity-path builder 113 may indicate that if a piece of content involved in a network activity is no longer publicly accessible for any reason, that network activity is removed from the activity path.

At step 260, the activity path may be stored in a data store, e.g., data storage 114 in FIG. 1, at which point the method ends. The stored activity path may be used some time in the future to enable one or more consumers to experience the same or similar network activities performed by the microproducer.

Although the present disclosure describes and illustrates particular steps of the method of FIG. 2 as occurring in a particular order, the present disclosure contemplates any suitable steps of the method of FIG. 2 as occurring in any suitable order. Moreover, although the present disclosure describes and illustrates particular apparatus or systems carrying out particular steps of the method of FIG. 2, the present disclosure contemplates any suitable apparatus or systems carrying out any suitable steps of the method of FIG. 2.

Figure 3A:
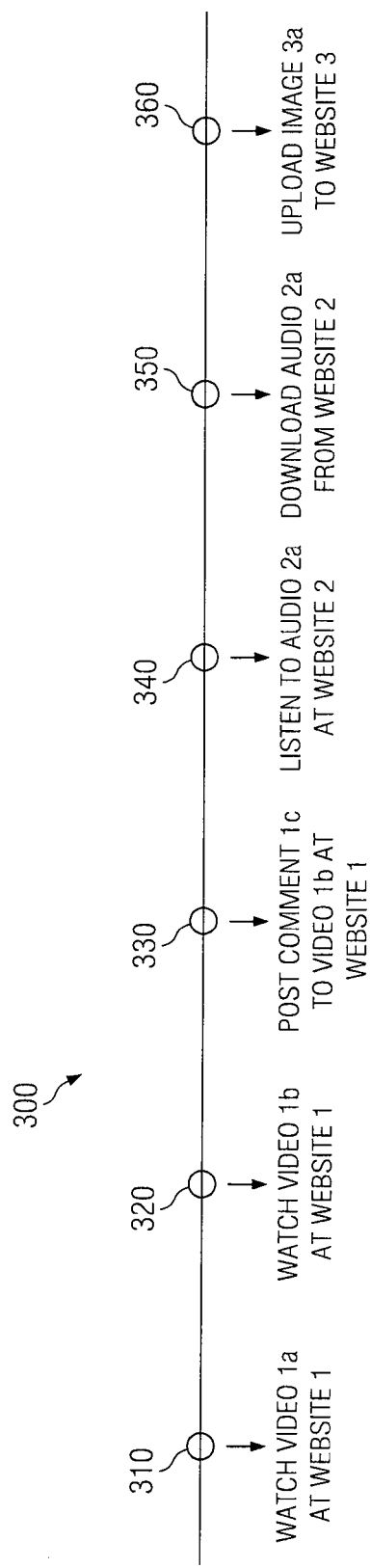
FIGS. 3A and 3B illustrate an example activity path.
Figure 3B:
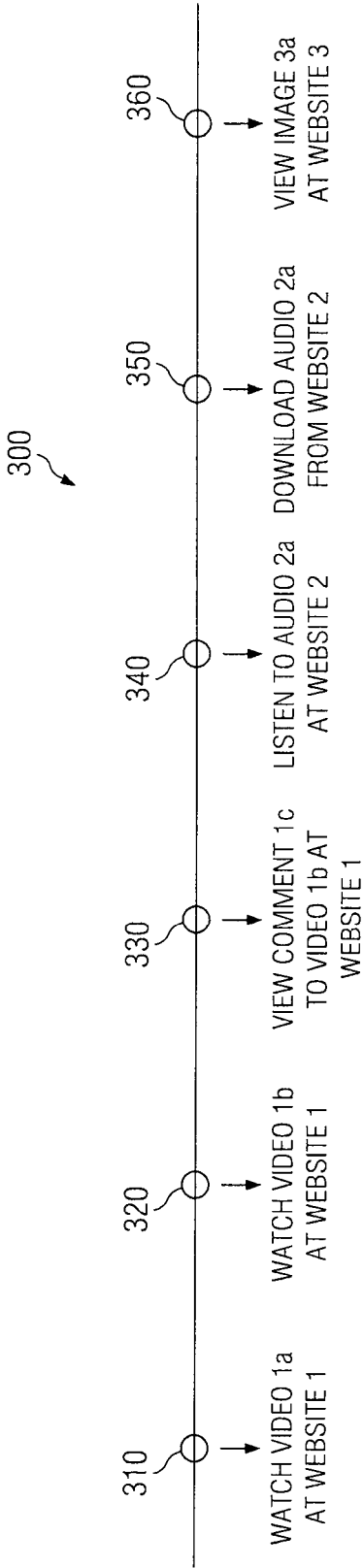

FIG. 3A illustrates an example activity path 300 constructed based on the following six example network activities performed by a microproducer: watching a first video (video 1a) at a first website (website 1); watching a second video (video 1b) at the first website (website 1); posting a comment (comment 1c) regarding the second video (video 1b) at the first website (website 1); listening to an audio (audio 2a) at a second website (website 2); download the audio (audio 2a) from the second website (website 2); and uploading an image (image 3a) to a third website (website 3). Suppose that the microproducer is willing to share these six events with the other people. Activity path 300 includes six points, points 310-360, corresponding to the six acts performed by the microproducer on the Internet. Some of these acts may be readily consumable by the other people. For example, the other people may also watch video 1a and video 1b at website 1 (corresponding to points 310 and 320 respectively) or listen to or download audio 2a at or from website 2 (corresponding to points 340 and 350 respectively). Some of these acts may not be readily consumable by the other people. For example, the other people would not post the same comment 1c regarding video 1b at website 1 (corresponding to point 330) or upload image 3a to website 3 (corresponding to point 360). Thus, these acts need to be modified so that they become readily consumable by the other people. For example, posting comment 1c regarding video 1b at website 1 (corresponding to point 330) may be modified to viewing comment 1c when video 1b is viewed at website 1, and uploading image 3a to website 3 (corresponding to point 360)

may be modified to viewing image 3*a* at website 3 or downloading image 3*a* from website 3. FIG. 3B illustrates example activity path 300 after example modification of the network activities corresponding to points 330 and 360 on activity path 300. In particular embodiments, activity-path builder 113 may modify points on activity paths, according to particular needs.

Particular embodiments may further modify an activity path, such as activity path 300, by adding additional points on the activity path. The points on the activity path that correspond to the network activities performed by the microproducer may be considered as primary points. In addition, secondary points may be added to the activity path at various appropriate locations, e.g., between the primary points, and each secondary point may correspond to an activity or event (which may, but need not necessarily, be a network activity or event) tailored for the specific consumer. The activities or events corresponding to the secondary points may be used to provide personalized experiences for the consumer. In particular embodiments, activities corresponding to secondary points are not ones performed by the microproducer. For example, the secondary points may correspond to activities similar to some of the activities corresponding to the primary points or to advertisements, such as the advertisements related to the activities corresponding to the primary points. Suppose one of the activities corresponding to a primary point involves the microproducer watching a video clip at a website about a car race event. A secondary point may be added that corresponds to another video clip about a similar car race event or to an advertisement selling tickets to upcoming car race events.

In particular embodiments, an activity path (such as activity path 300 in FIG. 3B) may enable consumers to have network experiences (which may be Internet experiences) for themselves that are similar to the network experience of the microproducer that the activity path was constructed based on. Particular embodiments provide a user interface that facilitates the network experiences of the consumers. In particular embodiments, the user interface includes one or more components (such as, for example, one or more control buttons, one or more display areas, one or more links, etc.) that enable the consumer to control or otherwise interact with the activity path, which may provide more personalized traversal of the activity path.

Figure 4:
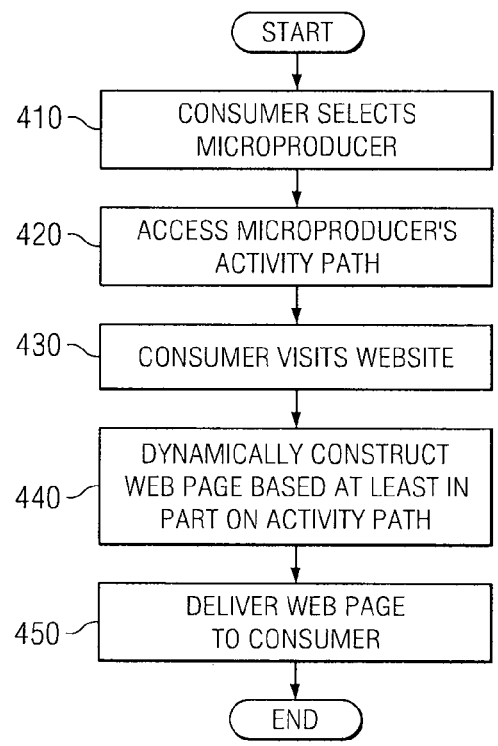
FIG. 4 illustrates an example method for traversing an activity path.

FIG. 4 illustrates an example method for traversing an activity path. As described above, one or more web pages may be a user interface for traversing an activity path. The method starts at step 410, where a consumer selects a microproducer and an activity path constructed based on the network experience of the microproducer, e.g., activity path 300 in FIG. 3B. As an example and not by way of limitation, the consumer may visit a central location, e.g., server 104 in FIG. 1, to review all available microproducers and their associated activity paths. The available microproducers and their associated activity paths may be presented to the consumer in one or more web pages. The consumer may select any microproducer and any activity path associated with a selected microproducer through the web pages. The selection may be stored in data store 114 as a part of a profile created for the consumer. For example, each consumer may have a corresponding profile that indicate the consumer's unique network identifier, the microproducers selected by the consumer and, the activity paths associated with each of the selected microproducers selected by the consumer. The consumer may modify his selection at any time to add or remove microproducers or activity paths from his profile. At step 420, server 104 accesses the activity path that the consumer has selected, e.g., activity path 300 in FIG. 3B. As described above, the activity path may be in data storage 114 and server 104 may access the activity path by reading it from data storage 114.

At step 430, some time after the consumer has selected his microproducers and the activity paths associated with the selected microproducers, the consumer may visit a particular website, e.g., website 1 in FIG. 3B. Website 1 may be hosted by one of servers 104. The server 104 hosting website 1, which the consumer is visiting, may access the consumer's profile stored in data storage 114 to determine which microproducers and which activity paths associated with the microproducers the consumer has previously selected. Suppose that the consumer has previously selected the microproducer whose network activities corresponding to activity path 300 in FIG. 3B. From activity path 300 in FIG. 3B, it may be determined that the corresponding microproducer has also visited the same website the consumer is visiting, e.g., website 1, and has performed some activities at website 1, e.g., having watched videos 1*a* and 1*b*, which correspond to some of the primary activity points on the microproducer's activity path 300. At step 440, the server 104 hosting the website the consumer is visiting, e.g., website 1, dynamically constructs one or more web pages for the consumer based on information in the activity path, e.g., activity path 300 in FIG. 3B, associated with the microproducer, who has also visited the website, selected by the consumer. As described above, the web page may function as a user interface that enables the consumer to experience for himself or herself the network experience of the microproducer that the activity path was constructed based on. In particular embodiments, the web page may include one or more first components and one or more second components. The first components may be selected according to the network activities on the activity path and the second components may be personalized for the consumer, as described above, for example. In particular embodiments, the web page may include one or more third components that enable the consumer to control or otherwise interact with the activity path. At step 450, the server 104 hosting the website the consumer is visiting, e.g., website 1, communicates the web page to the consumer, at which point the method ends.

Although the present disclosure describes and illustrates particular steps of the method of FIG. 4 as occurring in a particular order, the present disclosure contemplates any suitable steps of the method of FIG. 4 as occurring in any suitable order. Moreover, although the present disclosure describes and illustrates particular apparatus or systems carrying out particular steps of the method of FIG. 4, the present disclosure contemplates any suitable apparatus or systems carrying out any suitable steps of the method of FIG. 4.

To further explain the method of FIG. 4, consider example activity path 300 in FIG. 3B. Suppose that a consumer wants to traverse activity path 300. The consumer visits website 1 and requests a web page from website 1. Points 310, 230, and 330 correspond to network activities that the microproducer of activity path 300 performed at website 1. Note that the activity represented by point 330 performed by the microproducer has be modified from posting comment 1*c* to viewing comment 1*c* for the consumer. The network experience of the microproducer at website 1 included watching video 1*a* (corresponding to point 310), watching video 1*c* (corresponding to point 320), and viewing comment 1*c* (corresponding to point 330).

Figure 5:
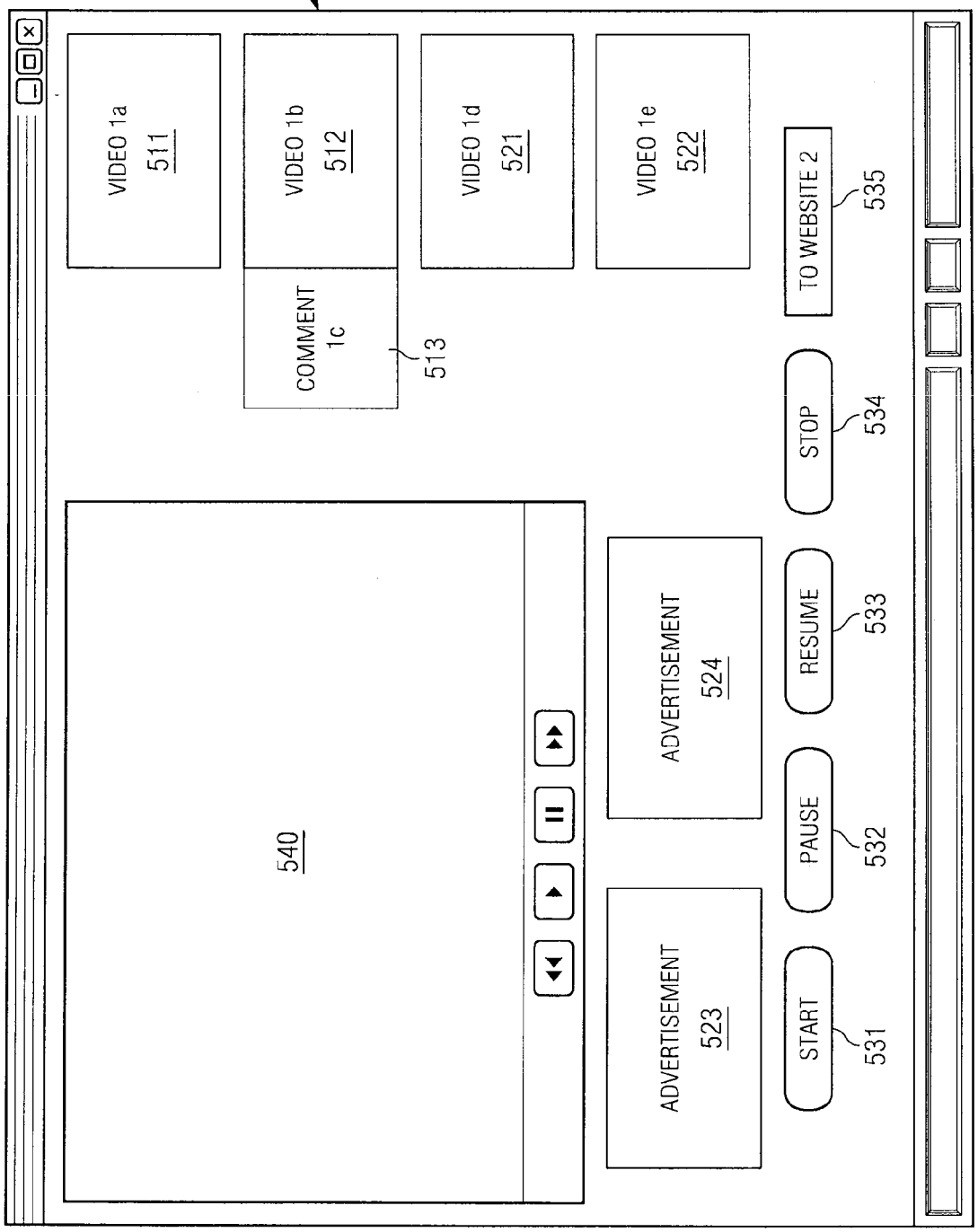
FIG. 5 illustrates an example web page constructed for traversing an activity path.

FIG. 5 illustrates an example web page 500 for traversing example activity path 300. Activity path 300 involves multiple websites, e.g., websites 1, 2, and 3, and each website may be hosted by a different one of servers 104. As described above with respect to FIG. 4, when a consumer visits a particular website, the server hosting that website may dynamically construct one or more web pages that enable the consumer to experience similar activities performed by the microproducer at that particular website based on the microproducer's activity path. In particular embodiments, each server hosting a particular website, when dynamically constructing the web pages for the consumer, only includes those activities performed by the microproducer at its own website in the web pages. Thus, for activity path 300 in FIG. 3B, if three different servers 104 host websites 1, 2, and 3, then when the consumer visits website 1, the server 104 hosting website 1 may dynamically constructs one or more web pages including activity points 310, 320, and 330, which correspond to the activities performed by the microproducer at website 1. When the consumer visits website 2, the server 104 hosting website 2 may dynamically constructs one or more web pages including activity points 340 and 350, which correspond to the activities performed by the microproducer at website 2. When the consumer visits website 3, the server 104 hosting website 3 may dynamically constructs one or more web pages including activity point 360, which corresponds to the activity performed by the microproducer at website 3.

Web page 500 is an example web page dynamically constructed for the consumer by the server 104 hosting website 1. Although the present disclosure describes and illustrates a particular web page 500 for traversing a particular activity path 300, the present disclosure contemplates any suitable web page for traversing any suitable activity path. Web page 500 includes link 511 to video 1a; link 512 to video 1b; and link 513 to comment 1c, which is next to link 512 to video 1b to indicate that comment 1c concerns video 1b. Links 511, 512, and 513 are example first components, as described above. Web page 500 also includes link 521 to video 1d and link 522 to video 1e. The consumer may select link 521 to video 1d or link 522 to video 1e based on the interests or preferences of the consumer. Web page 500 also includes advertisements 523 and 524, which may be tailored to or otherwise target the consumer. Links 521 and 522 and advertisements 523 and 524 are example second components, as described above. Web page 500 also includes control icons, such as start button 531, pause button 532, resume button 533, stop button 534, and link button 535. These control icons enable the consumer to control the traversal of the activity path. Start button 531, pause button 532, resume button 533, stop button 534, and link button 535 are example third components, as described above.

As an example and not by way of limitation, the consumer may click on or otherwise select start button 531 to start traversing activity path 300. In area 540, video 1a may play, followed by video 1b playing, and then comment 1c being displayed, which may be the same sequence of network activities in the network experience of the microproducer that activity path 300 was constructed based on. At any point, the consumer may pause the experience by selecting pause button 532 or stop the experience by selecting stop button 534. While watching video 1a, the consumer may find video 1d interesting. The consumer may select pause button 532 and then select link 521 to video 1d. Selecting pause button 532 and link 521 may cause video 1d to play in area 540, replacing video 1a. After watching video 1d, the consumer may select resume button 533 to return to activity path 300 where the consumer paused it. Selecting resume button 533 may cause video 1a to resume playing in area 540 from the point where the consumer paused video 1a. Thus, in particular embodiments, the consumer may deviate from activity path 300 and then return to activity path 300 at the point where the consumer deviated from it.

In particular embodiments, the consumer may select network activities in any order and need not traverse activity path 300 in the order that the microproducer performed the network activities in. As an example and not by way of limitation, instead of first selecting start button 531, the consumer may select link 512 to watch video 1b first and click on link 513 to read comment 1c next. The consumer may choose to watch video 1a last or skip watching video 1a entirely.

During the network experience of the microproducer that activity path 300 was constructed based on, the microproducer visited website 2 and listened to and downloaded audio 2a after watching videos 1a and 1b and posting comment 1c at website 1. Link button 535 may provide a link to website 2. The consumer may select link button 535 to navigate to website 2 to continue the experience, which may cause the server 104 hosting website 2 to construct a new web page for the consumer that includes components corresponding to elements of website 2, such as, for example, a link to audio 2a and one or more advertisements from sponsors of website 2.

In particular embodiments, when the consumer navigates to a particular website while traversing activity path 300, the web page constructed for the consumer by the server 104 hosting that website may include one or more components or other elements corresponding to all or fewer than all the network activities performed by the microproducer at the website that the consumer has navigated to. In particular embodiments, when a microproducer and a consumer both visit the same website, the web pages dynamically constructed for the microproducer and the consumer may not be exactly the same. Similarly, when two consumers of the same microproducer both visit a particular website, the web pages dynamically constructed for the two consumers may not be exactly the same. A consumer may visit a website via various means. For example, the consumer may enter the website's URL directly in his browser. Alternatively, the consumer may be led from one website to another website via an element included in a web page, e.g., by clicking on button 535 in web page 500.

For example, in FIG. 5, web page 500 includes links 511-513 to videos 1a and 1b and message 1c respectively. Web page 500 also includes links 521 and 522 to videos 1d and 1e respectively and advertisements 523 and 524, which are second components. The second components may be personalized for and tailored to the consumer and may be different for different consumers, different microproducers, or both. The third components (such as, for example, buttons 531-535) may also vary from one web page to another or one consumer to another. These third components may enable the consumer to navigate and control the way he experience the Internet experience of the microproducer.

In particular embodiments, a web page dynamically constructed for the consumer is automatically formatted by the server 104 hosting the website the consumer is visiting and constructing the web page for the consumer based on the client device e.g., a client device 106, used by the consumer. For example, if the client device used by the consumer is a desktop computer with a high-resolution, large size monitor, more components may be included in the dynamically constructed web page. On the other hand, if the client device used by the consumer is a smart phone with a small size display, few components may be included in the dynamically constructed web page. However, when the consumer visits a website, at least one network event or activity conducted by the microproducer at the same website that are on the activity path associated with the microproducer is included in the web page dynamically constructed for the consumer.

A user interface may be implemented using any suitable methods and including any suitable components. In particular embodiments, the user interface may be a part of a desktop application. In particular embodiments, the user interface may be a part of an Internet-based application, such as, for example, web page 500. Depending on the actual implementations of the user interface, the consumer may interact with the Internet experiences of the microproducer on different levels. For example, a user interface may include a few control buttons, such as, for example, a start button, a stop button, and a resume button. When the consumer enables the start button, the network activities corresponding to the primary and secondary points on the activity path are presented to the consumer in the order of the corresponding activity points on the activity path. Network activities from different websites are automatically retrieved and presented to the consumer without the consumer having to visit these sites individually.

Particular embodiments may be implemented as hardware, software, or a combination of hardware and software. As an example and not by way of limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 6:
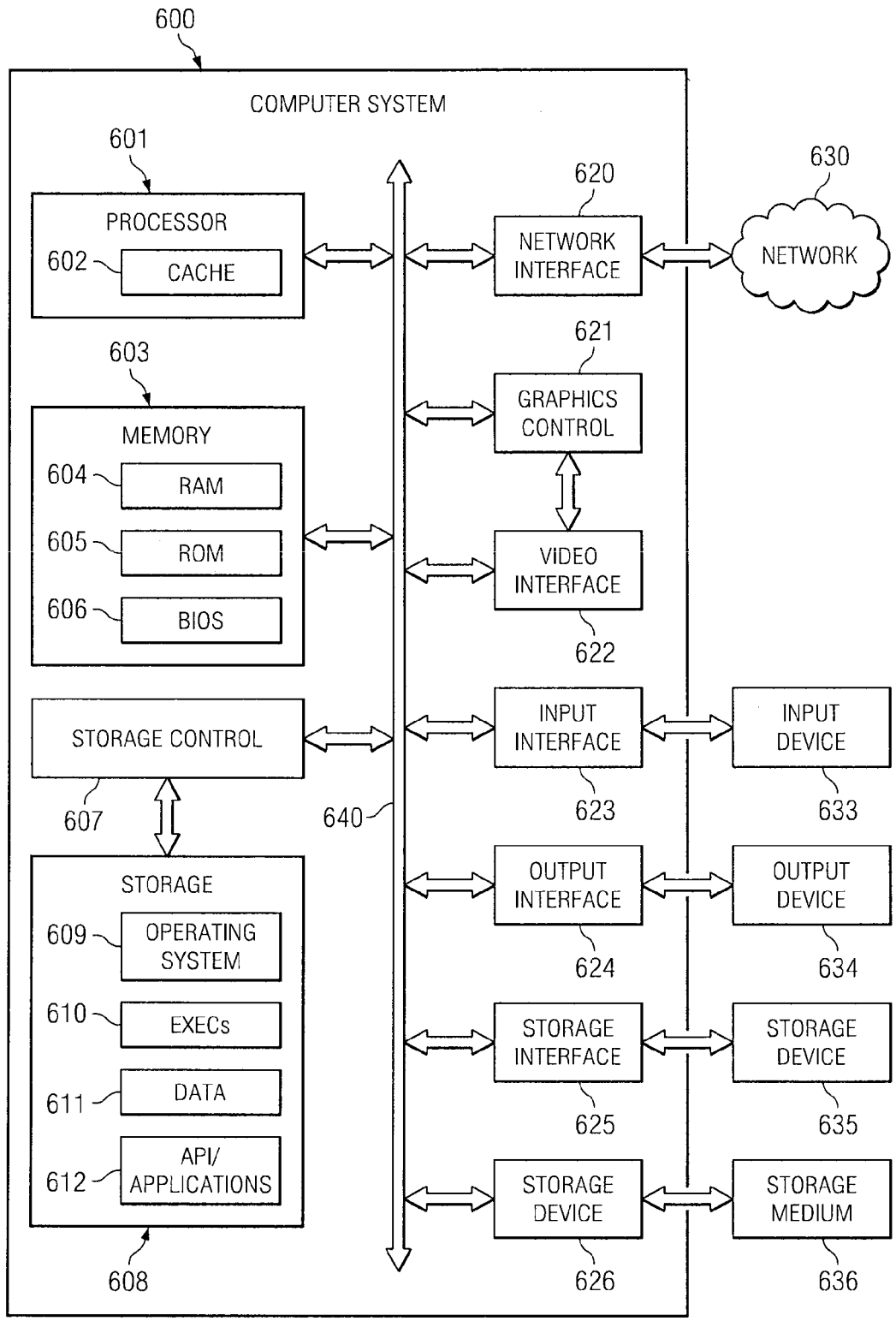
FIG. 6 illustrates an example computer system.

For example, FIG. 6 illustrates an example computer system 600 suitable for implementing one or more portions of particular embodiments. Although the present disclosure describes and illustrates a particular computer system 600 having particular components in a particular configuration, the present disclosure contemplates any suitable computer system having any suitable components in any suitable configuration. Moreover, computer system 600 may have take any suitable physical form, such as for example one or more integrated circuit (ICs), one or more printed circuit boards (PCBs), one or more handheld or other devices (such as mobile telephones or PDAs), one or more personal computers, or one or more super computers.

Computer system 600 may have one or more input devices 633 (which may include a keypad, keyboard, mouse, stylus, etc.), one or more output devices 634 (which may include one or more displays, one or more speakers, etc.), one or more storage devices 635, and one or more storage media 636. An input device 633 may be external or internal to computer system 600. An output device 634 may be external or internal to computer system 600. A storage device 635 may be external or internal to computer system 600. A storage medium 636 may be external or internal to computer system 600.

System bus 640 couples subsystems of computer system 600 to each other. Herein, reference to a bus encompasses one or more digital signal lines serving a common function. The present disclosure contemplates any suitable system bus 640 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 600 includes one or more processors 601 (or central processing units (CPUs)). A processor 601 may contain a cache memory unit 602 for temporary local storage of instructions, data, or computer addresses. Processors 601 are coupled to one or more storage devices, including memory 603. Memory 603 may include random access memory (RAM) 604 and read-only memory (ROM) 605. Data and instructions may transfer bidirectionally between processors 601 and RAM 604. Data and instructions may transfer unidirectionally to processors 601 from ROM 605. RAM 604 and ROM 605 may include any suitable computer-readable storage media.

Computer system 600 includes fixed storage 608 coupled bi-directionally to processors 601. Fixed storage 608 may be coupled to processors 601 via storage control unit 607. Fixed storage 608 may provide additional data storage capacity and may include any suitable computer-readable storage media. Fixed storage 608 may store an operating system (OS) 609, one or more executables (EXECs) 610, one or more applications or programs 612, data 611 and the like. Fixed storage 608 is typically a secondary storage medium (such as a hard disk) that is slower than primary storage. In appropriate cases, the information stored by fixed storage 608 may be incorporated as virtual memory into memory 603.

Processors 601 may be coupled to a variety of interfaces, such as, for example, graphics control 621, video interface 622, input interface 623, output interface, and storage interface 625, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 620 may couple processors 601 to another computer system or to network 630. With network interface 620, processors 601 may receive or send information from or to network 630 in the course of performing steps of particular embodiments. Particular embodiments may execute solely on processors 601. Particular embodiments may execute on processors 601 and on one or more remote processors operating together.

In a network environment, where computer system 600 is connected to network 630, computer system 600 may communicate with other devices connected to network 630. Computer system 600 may communicate with network 630 via network interface 620. For example, computer system 600 may receive information (such as a request or a response from another device) from network 630 in the form of one or more incoming packets at network interface 620 and memory 603 may store the incoming packets for subsequent processing. Computer system 600 may send information (such as a request or a response to another device) to network 630 in the form of one or more outgoing packets from network interface 620, which memory 603 may store prior to being sent. Processors 601 may access an incoming or outgoing packet in memory 603 to process it, according to particular needs.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 603 may include one or more computer-readable storage media embodying software and computer system 600 may provide particular functionality described or illustrated herein as a result of processors 601 executing the software. Memory 603 may store and processors 601 may execute the software. Memory 603 may read the software from the computer-readable storage media in mass storage device 603 embodying the software or from one or more other sources via network interface 620. When executing the software, processors 601 may perform one or more steps of one or more processes described or illustrated herein, which may include defining one or more data structures for storage in memory 603 and modifying one or more of the data structures as directed by one or more portions the software, according to particular needs. In addition or as an alternative, computer system 600 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   maintaining by one or more processors a set of rules that identify one or more types of online activities to be monitored and collected for a first user, the one or more types of online activities specified by the first user as online activities that are to be shared with other people;
   based on the set of rules designating by the first user the one or more types of online activities to be shared with other people, determining by the one or more processors that a subset of a sequence of online activities of the first user are of the one or more types of online activities to be monitored and collected;
   in response to determining that the online activities of the first user are of the one or more types of online activities, monitoring and recording by the one or more processors the subset of the sequence of online activities of the first user, wherein the subset of the sequence of online activities includes only the one or more types of online activities specified by the first user as the online activities that are to be monitored and collected, wherein the online activities comprising online consumption of online content by the first user;
   constructing by the one or more processors a path based on the subset of the sequence of online activities of the first user, the path comprising a sequence of online activity points that each correspond to one of the online activities in the subset of the sequence of online activities of the first user, the path enabling a second user to experience personally for himself or herself at least an approximation of the subset of the sequence of online activities of the first user;

maintaining by the one or more processors a profile associated with the second user, the profile identifying the first user as a microproducer in which the second user is interested; and in response to accessing the profile of the second user that identifies the first user as the microproducer in which the second user is interested, communicating by the one or more processors the path for traversal of a portion of the path by the second user, wherein recording the subset of the sequence of online activities of the first user comprises automatically recording, by a server hosting a particular website and based on the set of rules, the subset of the sequence of online activities of the first user at the particular website, wherein the path based on the subset of the sequence of online activities of the first user is constructed in response to the second user visiting the particular website, wherein the method further comprises:
at some time after the profile associated with the second user identifies the first user as the microproducer in which the second user is interested, determining that the second user has accessed the particular website associated with the online activities of the first user, and wherein communicating the path for traversal of the portion of the path comprising the sequence of online activity points associated with the particular website to the second user for traversal by the second user.

2. The method of claim 1, further comprising inserting by the one or more processors an advertisement point into the path communicated to the second user, the advertisement point corresponding to an advertisement, the advertisement related to the online activities of the first user but distinct from the online activities of the first user, traversal of the path by the second user causing presentation of the advertisement to the second user.

3. The method of claim 1, wherein:
the online activities of the first user are successive with respect to each other in the sequence of online activities of the first user; and
the online activity points are successive with respect to each other in the path.

4. The method of claim 1, wherein one of the online activities comprises the first user:
accessing a web page;
viewing online text;
viewing an online image;
listening to online audio;
watching online video;
posting a comment to a portion of a web page;
uploading data; or
downloading data.

5. The method of claim 4, further comprising modifying by the one or more processors selected ones of the online activities corresponding to selected ones of the online activity points so that they become suitable to be experienced by the second user.

6. The method of Claim, 5, wherein an online activity of posting a comment to a portion of a web page is modified to viewing the comment on the web page.

7. The method of Claim, 5, wherein an online activity of uploading data by the first user is modified to viewing the data or downloading the data by the first user.

8. The method of claim 1, wherein recording the subset of the sequence of online activities comprises recording the sequence of online activities based on the set of rules for determining what online activities of the first user to record and what online activities of the first user not to record.

9. The method of claim 1, wherein constructing the path comprises:
accessing a selection made by the first user of the subset of the sequence of online activities; and
constructing the path based on the selection of the subset of the sequence of online activities of the first user.

10. The method of claim 1, further comprising:
presenting by the one or processors the path to the first user;
accessing by the one or more processors a modification to the path made by the first user; and
modifying by the one or more processors the path based on the modification to the path made by the first user.

11. The method of claim 1, wherein recording by the one or more processors, the subset of the sequence of online activities of the first user comprises:
monitoring, by a network monitor-collector, the sequence of online activities of the first user, wherein the sequence of online activities are performed by the first user at a plurality of network sites; and
based on the set of rules, automatically recording, by the network monitor-collector, the subset of the sequence of online activities performed by the first user at the plurality of network sites by the first user.

12. The method of claim 11, wherein the sequence of online activities performed at the plurality of network sites comprises a sequence of online activities performed at a plurality of websites.

13. The method of claim 1, wherein recording by the one or more processors the subset of the sequence of online activities of the first user comprises:
recording, by a first network monitor-collector associated with a first network site, the subset of the sequence of online activities of the first user at the first network site; and
recording, by a second network monitor-collector associated with a second network site, the subset of the sequence of online activities of the first user at the second network site.

14. One or more non-transitory computer-readable storage media embodying software that is operable when executed to:
maintain a set of rules that identify one or more types of online activities to be monitored and collected for a first user, the one or more types of online activities specified by the first user as online activities that are to be shared with other people;
based on the set of rules designating by the first user the one or more types of online activities to be shared with other people, determine that a subset of a sequence of online activities of the first user are of the one or more types of online activities to be monitored and collected;
in response to determining that the online activities of the first user are of the one or more types of online activities, monitor and record the subset of the sequence of online activities of the first user, wherein the subset of the sequence of online activities includes only the one or more types of online activities specified by the first user as the online activities, that are to be monitored and collected, wherein the online activities comprising online consumption of online content by the first user;

construct a path based on the sequence of online activities of the first user, the path comprising a sequence of online activity points that each correspond to one of the online activities in the sequence of online activities of the first user, the path enabling a second user to experience personally for themselves at least an approximation of the sequence of online activities of the first user;

maintain a profile associated with the second user, the profile identifying the first user as a microproducer in which the second user is interested;

in response to accessing the profile of the second user that identifies the first user as the microproducer in which the second user is interested, communicate the path for traversal of a portion of the path by the second user, wherein recording the subset of the sequence of online activities of the first user comprises automatically recording, by a server hosting a particular website and based on the set of rules, the subset of the sequence of online activities of the first user at the particular website, wherein the path based on the subset of the sequence of online activities of the first user is constructed in response to the second user visiting the particular website, wherein the method further comprises:
  at some time after the profile associated with the second user identifies the first user as the microproducer in which the second user is interested, determining that the second user has accessed the particular website associated with the online activities of the first user, and
  wherein communicating the path for traversal of the portion of the path comprising the sequence of online activity points associated with the particular website to the second user for traversal by the second user.

15. The one or more non-transitory computer-readable storage media of claim 14, wherein the software is further operable when executed to record the sequence of online activities of the first user by:
  monitoring, by a network monitor-collector, the sequence of online activities of the first user, wherein the sequence of online activities are performed by the first user at a plurality of network sites; and
  based on the set of rules, automatically recording, by the network monitor-collector, the subset of the sequence of online activities performed by the first user at the plurality of network sites by the first user.

16. The one or more non-transitory computer-readable storage media of claim 15, wherein the sequence of online activities performed at the plurality of network sites comprises a sequence of online activities performed at a plurality of websites.

17. The one or more non-transitory computer-readable storage media of claim 14, wherein the software is further operable when recording the sequence of online activities of the first user to:
  recording, by a first network monitor-collector associated with a first network site, the subset of the sequence of online activities of the first user at the first network site; and
  recording, by a second network monitor-collector associated with a second network site, the subset of the sequence of online activities of the first user at the second network site.

18. An apparatus comprising:
  a memory comprising instructions for execution by one or more processors; and
  one or more processors coupled to the memory, the one or more processors being operable when executing the instructions to:
  maintain a set of rules that identify one or more types of online activities to be monitored and collected for a first user, the one or more types of online activities specified by the first user as online activities that are to be shared with other people;
  based on the set of rules designating by the first user the one or more types of online activities to be shared with other people, determine that a subset of a sequence of online activities of the first user are of the one or more types of online activities to be monitored and collected;
  in response to determining that the online activities of the first user are of the one or more types of online activities, monitor and record the subset of the sequence of online activities of the first user, wherein the subset of the sequence of online activities includes only the one or more types of online activities specified by the first user as the online activities that are to be monitored and collected, wherein the online activities comprising online consumption of online content by the first user;
  construct a path based on the sequence of online activities of the first user, the path comprising a sequence of online activity points that each correspond to one of the online activities in the sequence of online activities of the first user, the path enabling a second user to experience personally for himself or herself at least an approximation of the sequence of online activities of the first user;
  maintaining a profile associated with the second user, the profile identifying the first user as a microproducer in which the second user is interested;
  in response to accessing the profile of the second user that identifies the first user as the microproducer in which the second user is interested, communicate the path for traversal of a portion of the path by the second user,
  wherein recording the subset of the sequence of online activities of the first user comprises automatically recording, by a server hosting a particular website and based on the set of rules, the subset of the sequence of online activities of the first user at the particular website,
  wherein the path based on the subset of the sequence of online activities of the first user is constructed in response to the second user visiting the particular website,
  wherein the method further comprises:
    at some time after the profile associated with the second user identifies the first user as the microproducer in which the second user is interested, determining that the second user has accessed the particular website associated with the online activities of the first user, and
  wherein communicating the path for traversal of the portion of the path comprising the sequence of online activity points associated with the particular website to the second user for traversal by the second user.

19. The apparatus of claim 18, wherein the one or more processors are further operable to execute the instructions to record the subset of the sequence of online activities of the first user by:
  monitoring, by a network monitor-collector, the sequence of online activities of the first user, wherein the sequence of online activities are performed by the first user at a plurality of network sites; and
  based on the set of rules, automatically recording, by the network monitor-collector, the subset of the sequence of online activities performed by the first user at the plurality of network sites by the first user.

20. The apparatus of claim 19, wherein the sequence of online activities performed at the plurality of network sites comprises a sequence of online activities performed at a plurality of websites.

21. The apparatus of claim 18, wherein the one or more processors are further operable to execute the instructions to record the sequence of online activities of the first user by:
   recording, by a first network monitor-collector associated with a first network site, the subset of the sequence of online activities of the first user at the first network site; and
   recording, by a second network monitor-collector associated with a second network site, the subset of the sequence of online activities of the first user at the second network site.

* * * * *